June 14, 1932.  W. D. SARGENT  1,862,770
WHEEL DRIVE
Filed Dec. 28, 1929
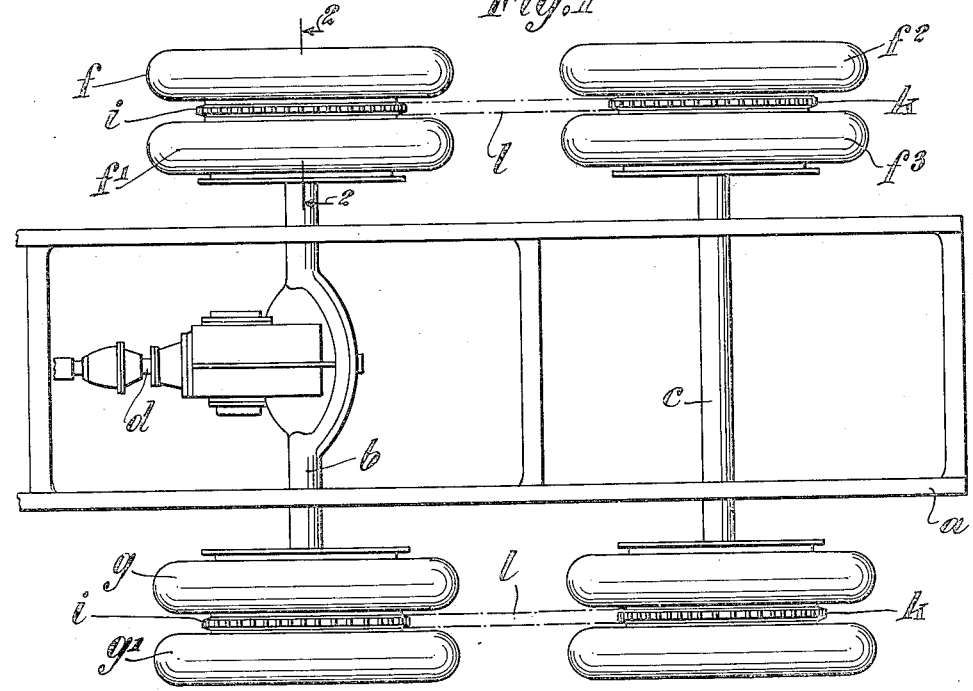
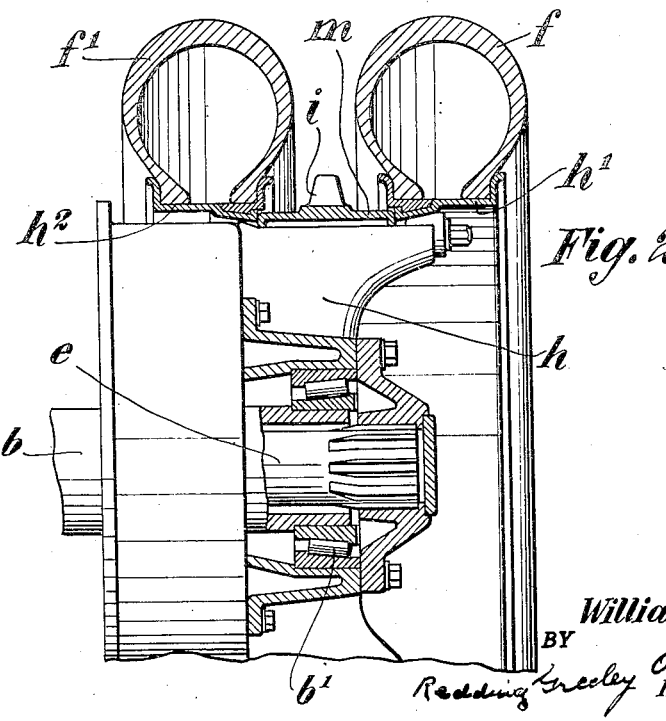
INVENTOR
William D. Sargent,
BY Redding Greeley O'Shea & Campbell
HIS ATTORNEYS Patented June 14, 1932

1,862,770

UNITED STATES PATENT OFFICE

WILLIAM D. SARGENT, OF NEWARK, NEW JERSEY

WHEEL DRIVE

Application filed December 28, 1929. Serial No. 417,024.

This invention relates to an improved drive for idle load wheels of a road vehicle and has for its principal object to provide a drive which with reference to the spring suspension and usual torquing elements will afford maximum flexibility in the suspension with maximum efficiency in the transmission of the driving forces. Still another object of the invention is to so relate the improved drive to the driving and driven wheels as to transmit the driving forces efficiently therebetween regardless of their relative positions. A further object is to provide a drive of the character described in which the reaction of the forces is most effectively taken by the wheel bearings so that unbalanced forces incident to the drive are not set up.

More specifically, the invention relates to the provision of driving and driven sprockets in a wheel drive which, in addition to satisfying the conditions hereinbefore described, shall serve the additional function of acting as spacers for the rims of dual tires. The improved sprocket, accordingly, may be associated with a spacer element disposed between the rims of dual tires, the construction in practice being such that the sprocket may be integral therewith or secured thereto. By such a construction the sprocket is disposed between dual tires on a wheel and the driving force of a chain engaged with the sprocket is accordingly transmitted between two such wheels in alignment at points between the tires thereby applying the turning effort uniformly to all four of the tires in equal proportions regardless of their relative positions and without imposing unbalanced forces on any one of the tires. Such a disposition of the driving units also permits the bearings to be so disposed with respect thereto as to take the forces of reaction in the most effective manner, the driving sprockets in the preferred form being preferably disposed within the same general plane vertically as the bearings, or at least within the area spanned by the bearings.

The invention will be described in greater detail in connection with the embodiment illustrated in the accompanying drawing, wherein:

Figure 1 is a view in plan showing somewhat schematically the rear end of a motor vehicle provided with two load axles, power being delivered only to one of said axles and from the wheels thus driven to the other wheels, respectively, through the improved drive.

Figure 2 is a fragmentary view in section and on a somewhat larger scale through one of the driven wheels shown in Figure 1 and taken on the plane indicated by the line 2—2 of Figure 1 and looking in the direction of the arrows.

As the description proceeds it will be evident that the improvements are not limited in their application to vehicles of any particular design nor to the character of the spring suspensions, torquing elements and associated parts of the vehicle. For this reason, it is sufficient in the accompanying drawing to show only the driving and driven wheels, some of the other usual elements of the motor vehicle being omitted in the interest of clearness. The chassis $a$ of the vehicle shown in Figure 1 is supported at its rear end by two load carrying axles $b$ and $c$ which, while illustrated as through axles might have substituted therefor, stub axles for each of the load wheels whereby independent springing is secured in accordance with practices heretofore proposed. The forward axle $b$ is shown as mounting a suitable final drive, the details of which are not illustrated but by which in accordance with known practices driving power is received from a propeller shaft $d$ and delivered to live axle sections $e$, one of which is shown in Figure 2. On the axle $b$ are mounted wheels shown as provided with dual tires $f, f'$, and $g, g'$, respectively, although as will be pointed out later single tires might be used without sacrificing many of the advantages attained by the improvements. Referring now to Figure 2, the axle $b$ is shown as provided with suitable wheel bearings $b'$, on which is mounted the wheel $h$. This wheel may be of such construction as to support spacing rims $h', h^2$, on which are secured the dual tires $f, f'$, respectively.

The other axle $c$ has mounted on it other load carrying wheels which track the wheels on the axle $b$, respectively, these wheels also having dual tires, two of which $f^2$, $f^3$, are shown as aligned with the tires $f$, $f'$. The principal object of the present invention is to provide an efficient drive for the idle load wheels from the driven load wheels. This drive is, in accordance with the invention, of sprocket and chain type. A sprocket $i$ is illustrated as mounted on the wheel $h$ between the rims $h$, $h^2$, and a second sprocket $k$ is shown as similarly mounted on the driven wheel which carries the tires $f^2$, $f^3$. A chain $l$ passes over these two sprockets and transmits the power from the sprocket $i$ to the sprocket $k$ whereby the driving wheel $h$, which receives power from the propeller shaft $d$, transmits power to the idler load wheel in line therewith on the axle $c$. By disposing the sprockets in the position illustrated it will be evident that complete compensation is afforded for relative movement between the driving and driven wheels without lessening, under any circumstances, the efficiency of the drive itself and regardless of the spring suspension and torquing arrangement employed. The power of the sprocket is always nicely apportioned between the tires of the wheels to which it is applied so that no unbalanced forces are set up tending to bind or damage any of the parts. A further feature of the invention resides in mounting each sprocket generally within the same vertical plane as the wheel bearings so that the force of the driving reactions is effectively taken up by the bearings. Figure 2 shows the sprocket $i$ in substantially the same plane as the wheel bearings $b'$ for the purpose noted.

Still another object of the invention is to associate the sprockets with the spacers for the rims on each wheel where, as in the illustrated embodiment, the rims such as $h'$, $h^2$, have a spacer interposed therebetween. Such a spacer is shown at $m$ and consists of a ring abutting against the proximate edges of the rims. The sprocket $i$ may in this form as shown be made integral with the spacer $m$ or as an obvious mechanical equivalent be attached thereto. One advantage of the type of wheel structure illustrated in Figure 2 when the improved drive is associated therewith, in the manner described, is that many of the advantages may be retained when a single tire is used in place of the dual tires as illustrated. This will be evident when it is considered that if either one of the tires $f$, $f'$, is removed the remaining rim or an equivalent therefor will maintain the relationship necessary for the use of the other tire in conjunction with the sprocket so that the driving forces will be effectively employed and their reaction taken by the bearings in precisely the manner heretofore pointed out.

The improvements are clearly effective where independently sprung wheels are used rather than single axles and complete flexibility in the suspension may be incorporated without affecting the transmission of the driving power in the manner contemplated. The invention is not to be limited to the construction described, therefore, its scope appearing from the appended claims.

What I claim is:

1. In combination with driving and idle wheels, a pair of rims mounted on each wheel, each rim being separately removable, spacers mounted between the rims, respectively, a sprocket associated with each spacer and a driving chain engaged with the sprockets.

2. In a vehicle, in combination with a positively driven load carrying road wheel, an idle load carrying road wheel tracking the driven wheel, a pair of spaced rims mounted on each wheel, bearings for the respective wheels, aligned sprockets mounted between the said pairs of rims, respectively, and disposed substantially in the plane of said bearings and a drive chain engaging the sprockets whereby rotation of the driven wheel imparts rotation to the idle wheel.

This specification signed this 26th day of December, A. D. 1929.

WILLIAM D. SARGENT.